United States Patent [19]

Keen

[11] Patent Number: 4,967,522

[45] Date of Patent: Nov. 6, 1990

[54] LANDSCAPE EDGING MEANS

[76] Inventor: Jan C. Keen, Rte. 1, P.O. Box 114, Fulton, Mo. 65251

[21] Appl. No.: 359,854

[22] Filed: May 31, 1989

[51] Int. Cl.$^5$ .............................................. E02D 27/00
[52] U.S. Cl. ........................................ 52/102; 47/32; 47/33; 404/7
[58] Field of Search ............... 47/32, 33; 52/102, 103, 52/155, 716–718; 256/13.1, 19; 404/6, 7, 9

[56] References Cited

U.S. PATENT DOCUMENTS

| | | | |
|---|---|---|---|
| 2,655,229 | 10/1953 | Harris | 404/7 X |
| 2,662,342 | 12/1953 | Peterson | 52/155 X |
| 4,601,140 | 7/1986 | Russo | 52/102 |
| 4,831,776 | 5/1989 | Fnitch | 47/33 |

FOREIGN PATENT DOCUMENTS

| | | | |
|---|---|---|---|
| 105437 | 3/1938 | Australia | 47/33 |
| 587195 | 5/1933 | Fed. Rep. of Germany | 47/33 |
| 2118243 | 2/1972 | Fed. Rep. of Germany | 47/33 |

Primary Examiner—Carl D. Friedman
Assistant Examiner—Jerrold D. Johnson
Attorney, Agent, or Firm—Charles F. Lind

[57] ABSTRACT

The invention discloses improved edging structures for landscaping, comprised of special curved wood pieces and straight conventional lumber pieces, such as 2"×4"s or 2"×6"s. The many separate adjacent pieces, aligned end to end, can be mixed and matched in size and curvature as desired to create a free flowing edging pattern, and then connected together by rigid clips in this aligned end to end manner. Some of the clips have rigid tabs formed off of them, and spikes may be driven through the tabs to hold the clips and connected edging pieces fixed in the created pattern. The edging pieces, as secured together, are partly embedded within the ground, with a top face exposed; and all of the clips, tabs formed thereon, and spikes are also embedded within the ground and hidden. The special curved pieces, clips and spikes may be grouped together to be sold in the form of kits.

12 Claims, 3 Drawing Sheets

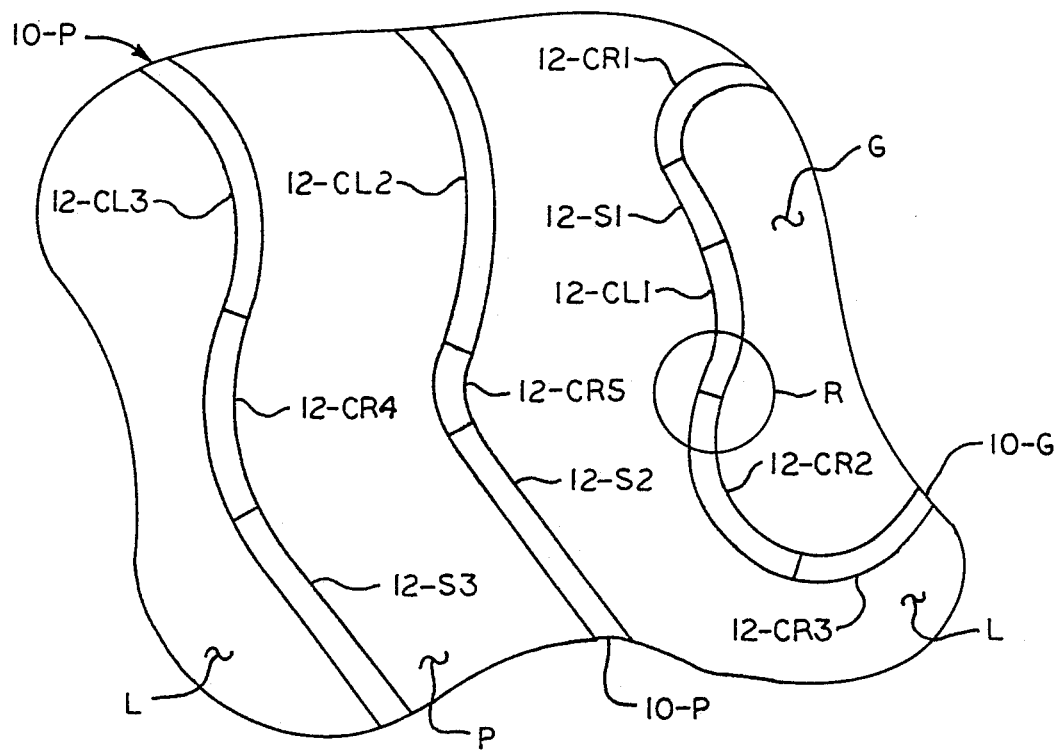
FIG. 1
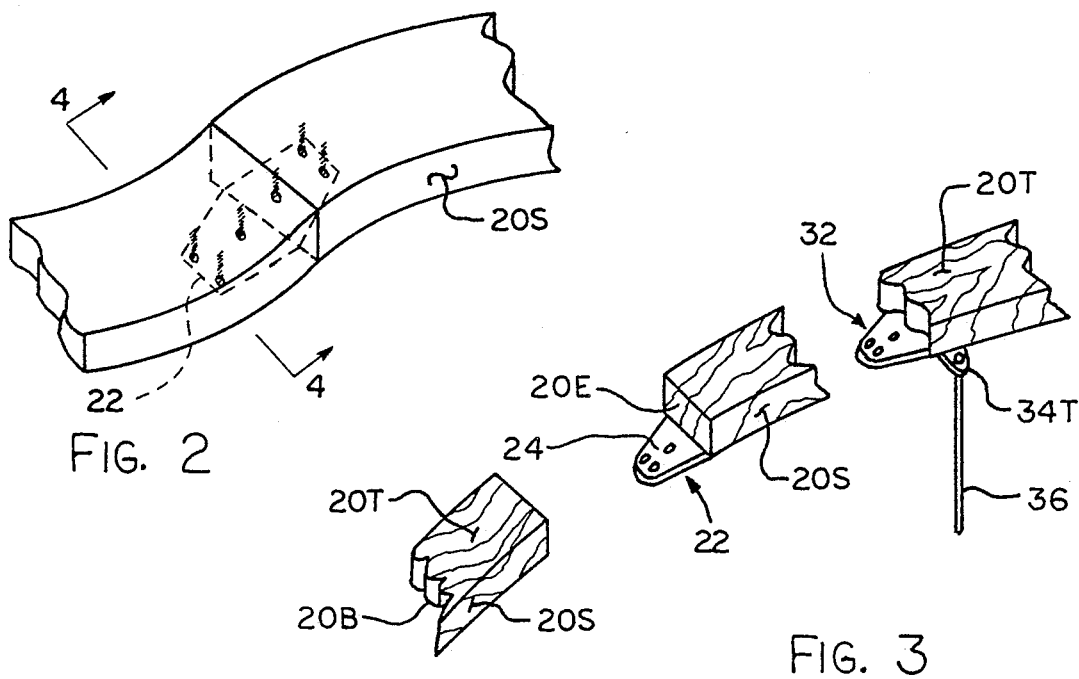
FIG. 2
FIG. 3

LANDSCAPE EDGING MEANS

BACKGROUND OF THE INVENTION

Edging means are commonly used in landscaping to separate lawn from path or garden areas. Generally, the edging means is partly embedded within the ground, to be partly exposed. Different materials have been used, including natural objects such as rocks or wood timbers, or man made objects such as webbings or channels of steel, aluminum or plastic.

One basic appeal edging means has relates to its appearance, including its overall squared or free-flowing shape and including how well it blends in or contrasts with the remaining surroundings. Of course, its durability, versatility, costs and/or ease of installation also affect its appeal and use.

Kit type edging products have particular appeal, as they can be purchased and installed by individual users. Frequently also, such edging products may be of a flexible component part or may have standard parts that can be rearranged slightly, to make it possible to design unique layouts. However, many such kits type edging products are not of wood and when installed, do not yield a quality appearance. Instead, the sizes, shapes and/or materials add nothing distinctive to the overall landscaping effort.

SUMMARY OF THE INVENTION

A primary object of the present invention is to provide edging means for landscaping, specifically in a kit form comprised of many separate straight and/or curved component pieces, allowing for end-to-end alignment of the pieces and the development of a free-flowing overall layout of a quality and unique appearance, and where the components with relative ease can be firmly secured together and relative to the earth for giving a long service life.

The invention uses a plurality of separate elongated rigid edging pieces, some straight and/or some curved, to provide that adjacent pieces can be accurately butted end-to-end as desired, to define any free-flowing edging layout; and further uses rigid clips that mechanically connect each adjacent pair of the edging pieces together as aligned end-to-end. The separate edging pieces have substantially identical rectangular cross-sections extended uniformly along their lengths (defining then opposed top and bottom faces, opposed side faces, and squared end faces) and are partly embedded in the ground, to have the bottom face and at least parts of the side faces hidden. Each clip is adapted to be secured flush against a hidden face of the edging piece to be out of view. Certain clips also have rigid tabs extended laterally beyond the side face of the edging piece, and a spike can be driven through the tab and into the ground to hold the clip and any joined edging piece(s) firmly embedded in the earth. The edging pieces can have the same cross-section as conventional 2"×4" or 2"×6" lumber pieces, to yield an overall quality appearance almost of a single continuous wooden edging member. Several edging pieces can also be layered on top of one another, and secured together, to define a free-flowing terrace edging higher than the 2" dimension of a single edging piece.

BRIEF DESCRIPTION OF THE DRAWING

FIG. 1 is a top plan view of several typical applications of the inventive edging means in landscaping;

FIG. 2 is an enlarged perspective view of the encircled region "R" in FIG. 1, illustrating adjacent component pieces connected together end-to-end;

FIG. 3 is a partly exploded perspective view of other components used in the invention;

DETAILED DESCRIPTION OF ILLUSTRATED EMBODIMENTS

Several applications of the subject landscaping or edging invention are illustrated in FIG. 1, showing border edging 10-G and 10-P respectively separating a garden area "G" and a path "P" from a lawn areas "L". Of particular interest to note is the free form contours of the border edgings 10-G and 10-P, while each gives an appearance of a unitary or continuous edging member. In point of fact however, the border edgings 10-G and 10-P are formed of separate edging pieces (identified generally as 12): of straight configurations (identified as 12-S1, 12-S2 and 12-S3), and of both rightwardly and leftwardly curved configurations (respectively identified as 12-CR1, 12-CR2, 12-CR3, 12-CR4 and 12-CR5; and as 12-CL1, 12-CL2 and 12-CL5), that are held together end-to-end by substantially hidden rigid clip means connected between adjacent pairs of the edging pieces.

Figure 9:
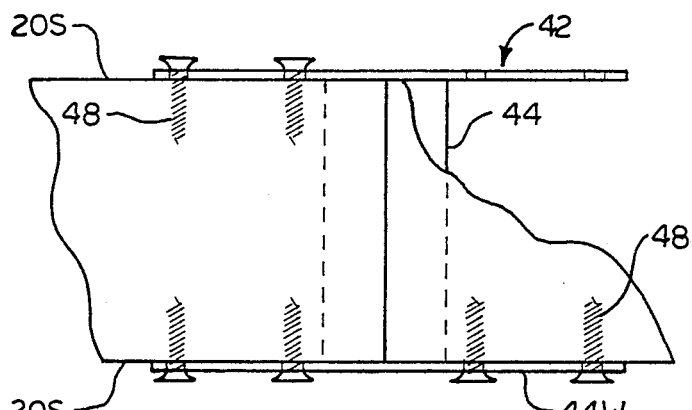
FIG. 9 is a top plan view, of several adjacent edging pieces connected together by yet another alternative form of a connecting clip.
Figure 10:
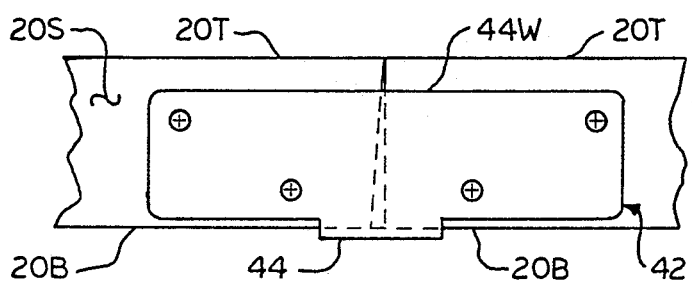
FIG. 10 is a side elevational view similar of the components of FIG. 9.

The separate edging pieces 12 illustrated have substantially identical rectangular cross-sections extended uniformly along their lengths, and as such define opposed top and bottom faces 20T and 20B and opposed side faces 20S connecting these faces 20T and 20B together. The pieces 12 are cut square across along radial lines at right angles between the side faces 20S, to provide ends faces 20E; and the end faces 20E further are angled slightly (see FIGS. 9, and 10) from the top face 20T to the bottom face 20B in the direction back toward the middle of the piece 12.

Figure 4:
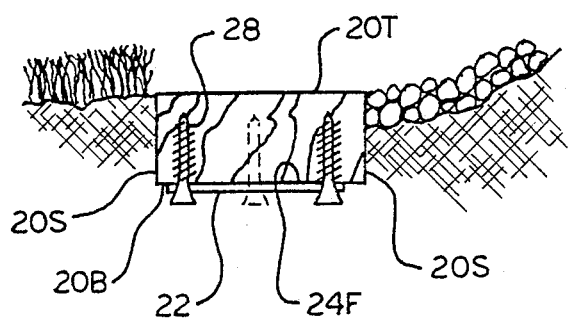
FIG. 4 is a sectional view as taken generally from line 4—4 in FIG. 2, except including also the background landscape of FIG. 1.
Figure 5:
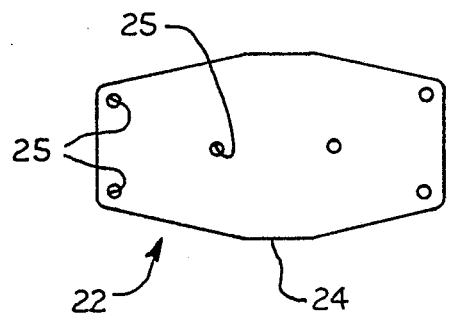
FIGS. 5 and 6 are top plan and edge views, respectively, of a connecting clip used in FIGS. 2 and 3 to hold adjacent.
Figure 6:
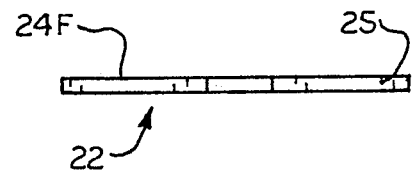
Figure 7:
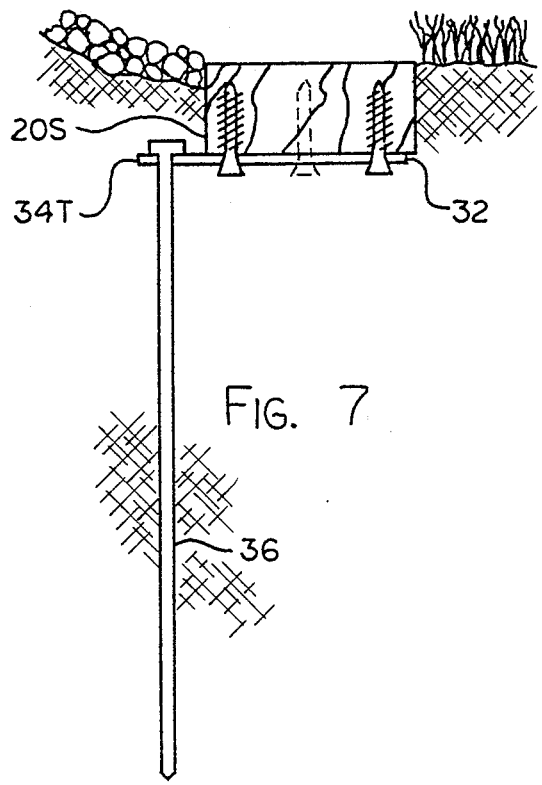
FIG. 7 is a perspective view, similar to FIG. 4, except illustrating an alternative form of a connecting clip.

The edging pieces 12 are adapted to be particially embedded in the earth (as illustrated in FIGS. 4 and 7), to have the bottom face 20B and at least parts of the side faces 20S hidden and to have the top face 20T generally exposed. The separate edging pieces 12 are oriented end-to-end and arranged to provide that the adjacent end faces 20E of the edging pieces substantially abut one another generally at the top faces 20T and that the side faces 20S blend together generally as continuous extensions of one another.

Several embodiments of clip means are illustrated, being suited to mechanically hold adjacent edging pieces together or relative to the ground. One such clip means 22 is shown in FIGS. 2–6, having a web 24 with a substantially planar face 24F adapted to overlap and be secured flush against a hidden face, typically bottom face 20B, of each edging piece 12 and to extend inwardly from the corresponding adjacent end face 20E thereof. Holes 25 are formed in the clip means web 24, and means in the form of screws 28 can be threaded into the edging pieces. This is suited then to secure the clip means web 24 to the adjacent edging pieces, and to mechanically join the adjacent edging pieces together and aligned so as to appear as a unitary member.

Figure 8:
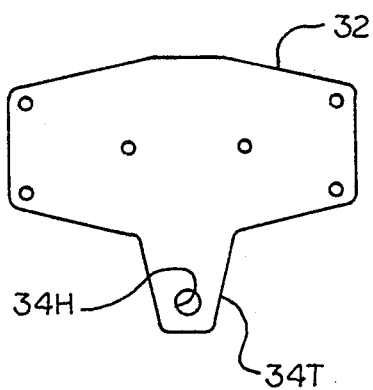
FIG. 8 is a plan view of the connecting clip used in FIG. 7.

Clip means 32 (see FIGS. 3, 7 and 8) also has a rigid tab means 34T extended off of the web 34, and adapted to extend laterally beyond the side face 20S of the edging piece 12 to be laterally offset from the exposed top face 20T. Means in the form of a landscaping spike 36 is adapted to be driven through a hole 34H in the tab means 34T and into the ground, to mechanically hold the clip means 32 and any joined edging piece(s) 12 firmly as embedded in the earth.

Figure 11:
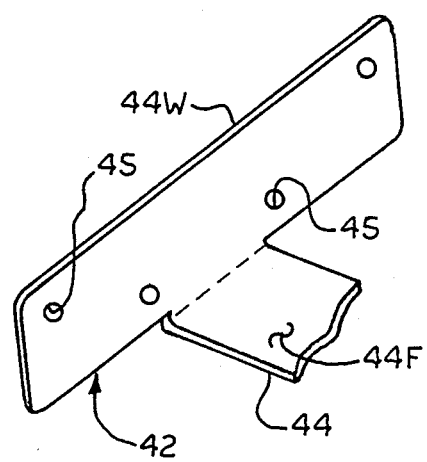
FIG. 11 is a broken away perspective view of approximately one-half of the connecting clip of FIGS. 9 and 10.

Clip means 42 (see FIGS. 9, 10 and 11) also has a rigid web 44 with a substantially planar face 44F adapted to overlap and be secured flush against the hidden face 20B of each edging piece 12 and to extend inwardly from the corresponding adjacent end face 20E thereof. Side wings 44W upstand at right angles from the web 44 and are spaced apart to span and overlap the side faces 20S of the edging pieces; a holes 45 are formed in the clip means wings 44W. Means in the form of screws 48 can be threaded into the edging pieces to secure the clip means wings 44W and web 44 relative to the adjacent edging pieces, to mechanically join them together as aligned so as to appear as a unitary member.

As the threaded members 48 cooperate with the side faces of the edging pieces, this clip means 42 has particular utility in securing the pieces together where it is not convenient to have access to the bottom face 20B. This might occur after several adjacent edging pieces have already been connected together to make the joined structure heavy and/or bulky to lift off of the ground to expose the bottom face 20B.

As will be appreciated, each curved edging piece 12-CR or 12-CL may be curved about a different radius of curvature, in either the rightward or leftward direction from a straight line. As the separate edging pieces 12 have substantially identical rectangular cross-sections extended uniformly along their lengths, only multiple pieces all of a single specific radius of curvature need be made, and the rightward or leftward direction can be obtained by flipping any one piece over one-half turn, to have the top face 20F become the bottom face 20B, and vice-versa. At any given radius of curvature, connecting a sufficient number of like curved pieces together end-to-end will eventually close to form a complete circle. On the other hand, by flipping a curved piece over one-half turn, the direction of curvature will be reversed, from being rightward to leftward, or vice versa, to provide a free-flowing form of curvature. Straight pieces can also be inserted between the curved pieces, for defining a specific shape of border edging.

Figure 14:
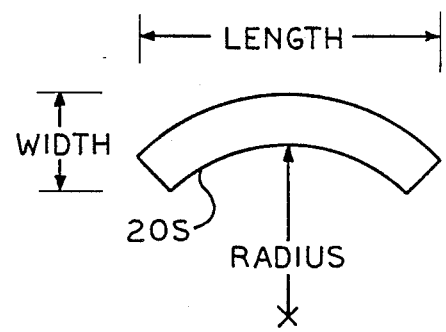
FIG. 14 is a top plan illustration of a curved edging piece used in the invention, illustrating specific operative features including the radius of curvature, the length, and the width of the piece.

As a practical matter, how much room each edging pieces takes for packaging and/or handling and how easily the edging piece can be made and handled, will in part determine the sizes of curved pieces and how many might be needed to make up a closed circle. This is illustrated in FIG. 14 by the "length" and "width" dimensions. For example, a single edging piece might be made of a length between one and six feet, and of a lateral width of up to possibly three feet; although an overall individual size no larger than four feet by one foot might be preferred. For purposes of this disclosure, the "radius" of curvature will be to the inside side face 20S of the edging piece.

Also as a practical matter, at least two edging pieces will be needed, each curved over possibly one-half turn (180 degrees) for making even a small diameter circle of only a foot or two. More likely, four, six, eight or ten separate edging pieces typically will be used for the more common anticipated sizes of circles of diameters between possibly four feet and up to ten feet. The overall length of edging needed for a full circle is readily calculated (3.14 times the outside diameter), as is the angle or arc each edging piece is curved over (360 divided by the number of edging pieces needed for a closed circle). For large diameter circles, such as a forty foot circle, possibly between thirty and forty separate edging pieces might be needed to define the closed circle, each piece curving over an arc as little as between possibly nine and twelve degrees and being of approximately four feet length or less.

In any layout, curved edging pieces 12 of different radii of curvatures of course can be used (such as small radius piece 12-CR1 or large radius piece 12-CL2); as well as reversing from a rightward curve to a leftward curve (as between 12-CR5 and 12-CR5), and vice-versa. It is entirely possible also to start out with (or purchase) a curved edging piece of four feet length, but to saw it in two and use only a portion of it. Straight edging pieces (such as 12-S1) can be interposed as desired between curved edging pieces. These selective variables provide for the generation of any free-flow curvatures desired.

In any edging layout, the different curved and straight edging pieces may be connected together end-to-end to yield the exposed top faces of the adjacent pieces that appears as a continuous piece, be it straight and/or curved in a nonlinear manner in one direction or back and forth on itself as a serpentine.

To allow the use of standard cut straight lumber pieces, such as 2"×4"s or 2"×6"s, the preferred cross-section of the curved component pieces 12-CR and 12-CL may likewise be of these standard sizes. As is known, the actual size of a 2"×4" lumber piece is smaller than these numbers, but the actual size is not of real concern, just having the sameness of size of the disclosed curved edging pieces and a straight standard cut straight lumber pieces. Similarly, the curved component pieces 12-CR and 12-CL may be formed of conventional construction materials of the type typically available at hardware or lumber outlets, of pine, oak, cedar, redwood, etc., and where appropriate the wood may be treated for durability.

The clip means may be of durable conventional structural material, such as steel, aluminum, plastic, etc. Also, although threaded screws are preferred, nails, staples or like can be used instead. Moreover, the clip means can be secured to the side or bottom faces (or even the top face) of the edging piece; or to an interior part of the edging piece spaced from the ends, particularly the ground anchoring clip means 32.

Figure 12:
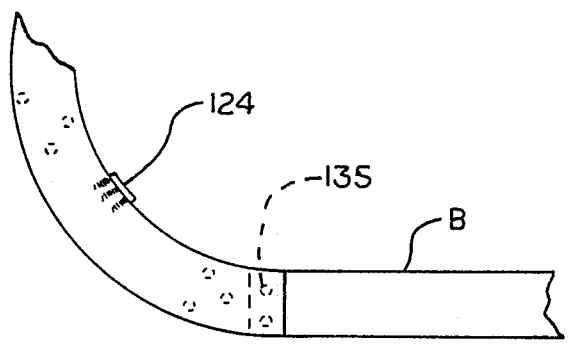
FIGS. 12 and 13 are respectively, top plan and front elevational views of yet another use for the invention.
Figure 13:
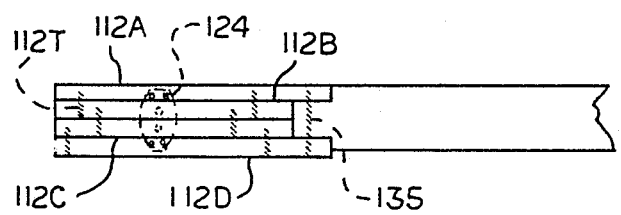

The disclosed composite edging system can be used with larger size wooden edging timbers now commonly used, such as 6″×6″ beams, to produce graceful curves between such members for a more appealing overall layout. This is illustrated in FIGS. 12 and 13. One version can merely have several of the disclosed curved edging pieces 112-A, 112-B, 112-C and 112-D layered on top of one another, and secured together, as by screws 112-T threaded into the underside of each, to the height and number needed. A clip (not shown) can then be overlapped at the ends of the composite defined edging pieces and the adjacent beam "B". A clip 124 can also be overlapped and secured against the hidden side edges of the defined beam. A more elaborate version would have the end of the larger beam "B" cut out or notched at the top and bottom, to create grooves or recesses to receive the ends of the upper and lower disclosed curved edging pieces 112-A and 112-D; and disclosed curved edging pieces 112-B and 112-C can be sandwiched between these pieces and layered on top of one another, and secured together by the screws. A conventional long screw 135 can also be threaded through the overlapped notched ends of the disclosed curved edging pieces and the beam, holding them firmly together.

While only specific embodiments of the invention have been illustrated, it is apparent that variations may be made therefrom without departing from the inventive concept. Accordingly, the invention is to be limited only by the scope of the following claims.

What is claimed as my invention is:

1. Edging means for landscaping the earth, comprising the combination of:

a plurality of separate elongated rigid edging pieces, and means including rigid clip means adapted to be connected between each adjacent pair of the edging pieces for holding such edging pieces together end-to-end;

the separate edging pieces each being formed of wood and having substantially identical rectangular cross-sections extended uniformly along their lengths, to define top and bottom faces, and side faces connecting these faces together, the pieces being cut square across at right angles between the side faces of the pieces to provide ends faces, and at least one of the edging pieces being curved about a single radius of curvature to provide that said top face is directed as an arcurate band;

the edging pieces being adapted to be partly embedded in the earth, to have the bottom face and at least parts of the side faces hidden and to have the top face generally exposed and substantially horizontally, and the separate elongated edging pieces being oriented end-to-end and arranged to provide that the adjacent ends of the edging pieces substantially abut one another generally at the top faces and that the side faces blend together, generally as continuous extensions of one another;

each of the clip means having a web with a substantially planar face adapted to overlap flush against one of the hidden faces of each edging piece and to extend inwardly from the corresponding adjacent ends thereof, and means to secure the clip means web to the edging piece as so positioned to mechanically join the adjacent edging pieces together and aligned so as to appear as a unitary member, and the clip means being completely embedded in the earth to be hidden; and certain of the clip means also having rigid tab means extended off of the web and extended laterally beyond the side face of the edging piece, and spike means adapted to be driven through the tab means and into the earth to mechanically hold the clip means and any joined edging piece(s) as embedded in the earth, and the tab and spike means also being completely embedded in the earth to be hidden.

2. Landscape edging means according to the combination of claim 1, further including said clip means web having holes therein and being adapted to overlap and be secured flush against the bottom faces of the adjacent edging pieces, and said holding means including threaded members extended through the holes in the clip means web and threaded into the edging pieces.

3. Landscape edging means according to the combination of claim 1, further including said clip means having side wings upstanding at right angles from the web and adapted to span and overlap the side faces of the edging pieces; means to connect the side wings flush against the side faces of the edging pieces; and the clip means side wings and the connecting means being adapted to be completely embedded in the earth to be hidden.

4. Landscape edging means according to the combination of claim 1, further including the said end faces further being angled from the top face to the bottom face in the direction toward the middle of the piece, to provide that adjacent edging pieces will butt at and establish a close fit at the butted top faces, for creating the appearance the adjacent edging pieces are a unitary member.

5. Landscape edging means according to the combination of claim 1, further including said tab and clip means being substantially rigid, and the tab means being substantially coplanar with the web and extended laterally beyond the side face of the piece to be laterally offset from the exposed top face.

6. Landscape edging means according to the combination of claim 1, further including the feature that edging pieces curved to a similar curvature are layered on one another to assume a thickness larger than a single edging piece, means to secure the layered edging pieced together, a beam of the same size approximately as the layered secured edging pieces, and means to secure the beam and the layered secured edging pieces together aligned end to end at the adjacent ends of each.

7. Landscape edging means according to the combination of claim 1, further including the feature that a plurality of the wood edging pieces are grouped together as a kit, where each such edging piece in the kit is curved, and where the straight wood edging pieces are conventionally sized cut wood lumber pieces and are not in the kit.

8. Landscape edging means according to the combination of claim 1, further including said end faces further being angled from the top face to the bottom face in the direction toward the middle of the piece, to provide that adjacent edging pieces will butt at and establish a close fit at the butted top faces, for creating the appearance the adjacent edging pieces are a unitary member; and further including the feature that a plurality of the wood edging pieces are grouped together as a kit, where each such edging piece is curved; and where the straight wood edging pieces are conventionally sized cut wood lumber pieces.

9. Landscape edging means according to the combination of claim 8, further including said clip means having side wings upstanding at right angles from the web and adapted to span and overlap flush against the side faces of the edging pieces; means to connect the side wings flush against the side faces of the edging pieces; and the clip means side wings and the connecting means being adapted to be completely embedded in the earth and hidden.

10. A kit of edging means for landscaping the earth, comprising the combination of:

a plurality of separate elongated rigid edging pieces, the separate edging pieces each being formed of wood and having substantially identical rectangular cross-sections extended uniformly along their lengths, to define top and bottom faces, and side faces connecting these faces together, the pieces being cut square across at right angles between the side faces of the pieces to provide ends faces, and said edging pieces each being sized with a cross-section the same as straight conventionally sized cut wood lumber pieces;

each separate elongated rigid edging pieces being curved, each about a specific radius of curvature, to provide that said top face of each is directed as an arcurate band; and means including rigid clip means adapted to be connected between each adjacent pair of the edging pieces and/or the straight pieces, for holding such pieces together aligned end-to-end to appear as a unitary edging member;

said rigid clip means having a web and having a substantially planar face adapted to extend inwardly beyond the end faces of the pieces to overlap the bottom and/or side faces of adjacent pairs of pieces and overlapping portions of the clip means having openings therein, and screw means to fit through the openings effective to secure the clip means flush against the faces of the adjacent pieces, and certain of the clip means also having rigid tab means extended off of the web, adapted to extend laterally beyond the side face of the piece, and spike means adapted to be driven through the tab means and into the earth to mechanically hold the clip means and any joined edging piece(s) as embedded in the earth, and the clip, tab and spike means all being adapted to be completely embedded in the earth and hidden.

11. A kit of landscape edging means according to the combination of claim 10, further including said end faces further being angled from the top face to the bottom face in the direction toward the middle of the piece, to provide that adjacent edging pieces will butt at and establish a close fit at the butted top faces, for creating the appearance the adjacent edging pieces are a unitary member.

12. A kit of landscape edging means according to the combination of claim 10, further including said clip means having side wings upstanding at right angles from the web and adapted to span and overlap flush against the side faces of the edging pieces; means to connect the side wings flush against the side faces of the edging pieces; and the clip means side wings and the connecting means being adapted to be completely embedded in the earth and hidden.

* * * * *